Sept. 26, 1961  M. KAHN ET AL  3,002,137
VOLTAGE DEPENDENT CERAMIC CAPACITOR
Filed Sept. 4, 1957  2 Sheets-Sheet 1

*INVENTORS*
MANFRED KAHN
GLENN F. COOPER

BY Connolly and Hutz

THEIR ATTORNEYS

3,002,137
VOLTAGE DEPENDENT CERAMIC CAPACITOR
Manfred Kahn and Glenn F. Cooper, North Adams, Mass., assignors to Sprague Electric Company, North Adams, Mass., a corporation of Massachusetts
Filed Sept. 4, 1957, Ser. No. 681,921
6 Claims. (Cl. 317—261)

This invention relates to ceramic capacitors and more particularly to ceramic capacitors having a relatively small area of active dielectric.

One group of ceramic materials has the property of developing a dielectric constant that is a function of the voltage applied across the dielectric. Ceramic materials having the higher dielectric constants usually also exhibit the higher voltage dependencies. Voltage sensitive capacitors for high frequency applications must be constructed so as to hold the capacity to a relatively low value in order to avoid the flow of excessive high frequency current through the capacitor. It is advisable in these constructions to use a relatively thin dielectric so that a low control voltage may be employed. This presents the problem of designing a capacitor to a low capacitance using a thin high dielectric constant material. It is proposed by this invention to limit the size of active electrode in the capacitor to achieve the low capacity and at the same time provide a device which is conveniently assembled.

Another consideration is found in the fact that, in general, dielectrics which are voltage sensitive lose both capacitance and voltage dependency as temperature increases. Considerable heat may be developed in a very small volume of active dielectric at radio frequencies. This heat is proportional to the dielectric losses and the high current density in the capacitor and it is necessary that the heat be dissipated with a small temperature rise if the capacitor is to be effective and useful. It is desired, therefore, to provide a capacitor which will operate as an efficient heat sink and to decrease the temperature rise caused by high frequency currents.

It is an object of this invention to provide a capacitor of limited area of active dielectric.

It is another object of this invention to provide a capacitor of limited opposed active electrode surfaces and a method of mounting on a capacitor dielectric limited opposed active electrode surfaces.

Still another object of this invention is a ceramic capacitor which is operable at high currents with good heat dissipation.

It is a still further object of this invention to provide a ceramic capacitor having a limited active dielectric area and a body capable of acting as a heat sink together with an electrode area effective in easily being attached to a lead and a lead of a relatively large size attached to said electrode.

A further object of this invention is a means and method for easily and economically constructing a capacitor having limited opposed active electrode surfaces which is easily and conveniently assembled with other components.

These and other objects of this invention will become more apparent upon consideration of the following description taken together with the accompanying drawings wherein.

Figure 1:
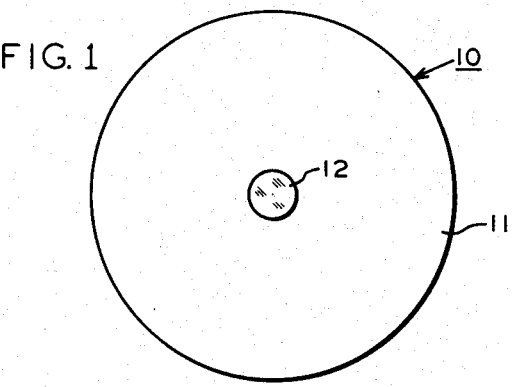
FIG. 1 is an elevational view of a ceramic disc of a capacitor showing an active electrode on one surface.
Figure 2:
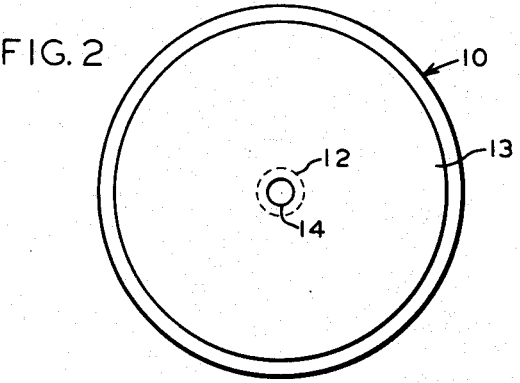
FIG. 2 is an elevational view of the ceramic disc of FIG. 1 carrying an annulus according to this invention.
Figure 3:
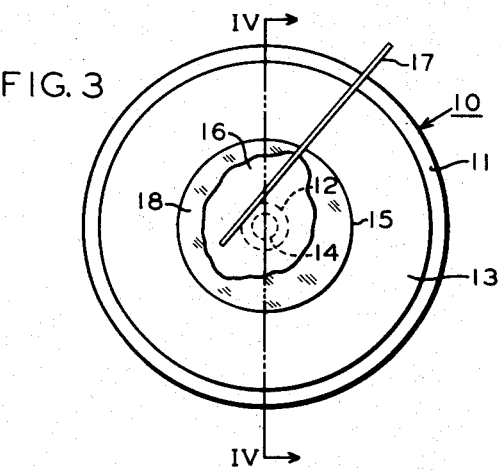
FIG. 3 is an elevational view of the ceramic disc capacitor of this invention with a second or terminal electrode and electrical lead.
Figure 4:
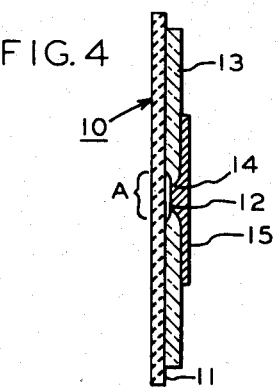
FIG. 4 is a radial section of the capacitor of FIG. 3 taken on line IV—IV thereof in the direction of the arrows.

FIG. 1 shows a ceramic disc 10 of a capacitor in elevation having deposited on the facing surface 11 thereof a dot of conducting material forming an electrode 12 to provide a definite limited area of electrode contact on the surface 11. In FIG. 2 the ceramic disc 10 and electrode 12 are shown covered with a vitreous enamel annulus 13 having a central orifice 14 extending inwardly to the center of the electrode 12. FIG. 3 shows the ceramic disc 10 carrying the dot electrode 12 and the annulus 13 covered with a large electrode 15 which overlies the dot electrode 12 and substantially all of the annulus 13. As shown in FIG. 4 the electrode 15 is formed to intrude into the orifice 14 of the annulus 13 and to come into good electrical contact with the electrode 12. As shown in FIG. 3 the electrode 15 does not completely cover and overlap the annulus 13, so that there is provided a lip of the annulus 13 beyond the outermost periphery of the electrode 15 which is not covered by the electrode 15. Consequently, the electrode 15 does not reach to or come into contact with the surface 11. The electrode 15 is thus separated from disc 10 and electrical contact is made through the electrode 12.

The active surface for applying voltage to the ceramic disc is the area of contact of the electrode 12 with the surface of the disc 10 indicated by a brace at A in FIG. 4. The electrode 15 does not present any additional electrode surface for applying voltage to the ceramic disc in establishing a capacitance in the capacitor formed from the disc 10. A suitable lead 17 may be attached to the electrode 15 as shown in FIG. 3 by suitable means such as solder 16. Inasmuch as our invention contemplates utilization of lead 17 as a means to conduct heat from the electrode area, the leads whether in the form of wires or tabs should be of considerable cross-sectional area. For optimum heat conductivity, lead 17 should be positioned over active electrode 12; or at least, lead 17 should be connected to contact electrode 15 by a mass of solder 16 sufficient to substantially completely overlie active electrode 12. The outer surface 18 of the electrode 15 is relatively large and receptive of the connection of the lead 17 thereto.

Figure 5:
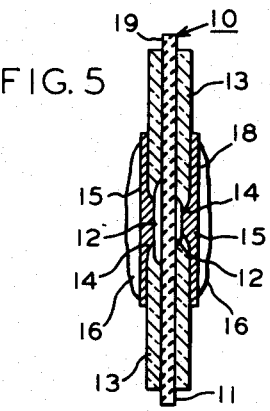
FIG. 5 is a radial section of a capacitor of this invention showing the electrodes of this invention mounted on both surfaces.

A surface 19 of the disc 10 opposite to the surface 11 can receive an electrode similar to electrode 12 or may receive a large electrode. In FIG. 5 the cross section of a capacitor of this invention shows the disc 10 with opposing surfaces 11 and 19, each carrying one of a pair of dot electrodes 12 diagrammatically positioned and each having an annulus 13 and a non-critical electrode 15. Each electrode 15 in turn receives and has fastened to it an electrode lead 17. The dot electrodes 12 may be of the same or different size forming an area A of contact with their respective surfaces 11 and 19. The completed capacitor with attached leads is dipped into an encapsulating resin to provide insulation and protection to the components. On hardening of the resin the capacitor is ready for use. This resin cover may be impregnated with wax to ensure a moisture proof unit.

The component parts mounted on the ceramic disc surfaces according to this invention may be applied by screening methods. The various components are screened on in any satisfactory manner to produce a voltage dependent ceramic capacitor in which small capacitances may be produced, for example, of the order of 500 μμf. down to about 20 μμf. In one specific example of the construction of this invention a ceramic disc of a barium titanate, BaTiO₃ composition having a K of 7,000 and a thickness of 10 mils and a diameter of 0.5" may be made into a capacitor with a capacitance of about 150 μμf. A dot electrode of 30 mils in diameter is placed in the center of one face of this ceramic disc. An annulus of vitreous enamel having a K of less than 10 is screened on the face of the disc to a thickness perpendicular to the face of about 5 mils. The annulus is applied to the ceramic disc face and the dot electrode so that the overlap of the dot electrode also covers part of the face thereof, as described above. At the center of the annulus an opening onto the dot electrode of less than 30 mils in diameter is provided. The low dielectric constant material of the annulus may be filled with aluminum oxide or some other non-conductive filler to permit a thicker build-up to be more readily achieved. A large area of contact electrode material is then screened on top of the annulus so that it contacts the original active electrode dot only through the orifice in the annulus. The active electrode material is preferably especially formulated to utilize to the highest possible extent the voltage sensitivity of the ceramic. This dot electrode material permits the finished capacitor to obtain the highest voltage sensitivity and highest voltage breakdown of which the ceramic base is capable, by providing intimate contact between the ceramic and the conducting particles of the electrode material. The effect of the interlayer of binder found between a base and the conducting particles in any electrode material can be kept to a minimum in the dot electrode material by employing a binder which does not float the conducting particles; thereby providing as thin an interlayer as possible with a screened-on electrode material. The outer electrode that is screened on top of the annulus may be made up of material which is less critical in its electrical characteristics, in that it need not be capable of utilizing the highest possible voltage sensitivity of the ceramic. Inasmuch as the second electrode is required to serve only as a link between the active dot electrode and the terminal means, and of such a large area as to permit ease of soldering, a compromise can be effected between electrical properties and solderability. This compromise may be obtained by providing a binder which floats the conducting particles. Thus it should be noted that the construction of this invention permits use of the right electrode material at the right place. The material of the dot electrode may be much more costly and also may be difficult to solder. The material of the outer electrode on the other hand may be less expensive and at the same time easier to apply leads to by soldering. On the other hand, in some applications of this invention the same material may be used for both electrodes. Electrical connection may be made with the outer large electrode by suitable means, such as by tinning the entire electrode area and providing a solder coating 16 of appreciable area to aid in dissipating heat from the device.

Figure 6:
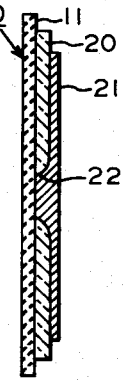
FIG. 6 is a radial section of a ceramic disc for a capacitor with a modified electrode on one surface and mounted according to this invention.

An alternative construction of the capacitor of this invention can be made up by applying an annulus 20 of vitreous enamel to the surface 11 of the ceramic disc 10 as shown in FIG. 6. In this modification a single electrode 21 is then applied to the disc 10 over the annulus 20 with the electrode material intruding into an orifice 22 formed by the annulus 20 to come into contact with the surface 11 and provide an active capacitance producing area. This method of construction eliminates the initial positioning of an active dot electrode on the disc surface before the application of the vitreous enamel annulus and the large area electrode. This modification is not as desirable as the preferred embodiment of this invention because of the problem presented when the annulus 20 is deformed and decreased in size or shape by the flowing of the vitreous enamel after application to the surface 11. Such deforming of the annulus 20 affects the orifice 22 and the area of contact of electrode 21 on the disc surface 11, and thus changes the characteristics of the resultant capacitor.

Another modification of this invention may be effected where stray capacitance need not be so critically controlled. Stray capacitance reduces the effective voltage sensitivity of a capacitor. For a construction which can tolerate some stray capacitance, the second applied electrode may be screened directly onto the second face 19 of the disc 10, omitting the intervention of vitreous enamel structure. In other words, the composite structure of this invention may be applied to only one surface of the ceramic disc but yet achieve the effect of the limited area of voltage application to the capacitor.

As a further modification, the assembled capacitor may be mounted in a button type mounting instead of being provided with lead wires and a plastic coating. Several other means for mounting may be employed but in general these are less desirable. The assembly of the capacitor in the button type mounting provides for an even better heat dissipation than is provided by the resin coating. It is to be noted that in the button type mounting of the capacitor the electrical connection to the capacitor will have very low inductance.

This invention is effected by combining a limited active area electrode on a high dielectric constant base with a non-conducting vitreous material of a low dielectric constant which is deposited on the capacitor in a viscous state having an orifice forming structure which can be formed in the viscous vitreous material. It is important to emphasize that best practice of this invention requires that there be at least an order of magnitude between the dielectric constants of the ceramic base and the vitreous enamel. Typical ratios of dielectric constants between the two materials of 500 to 1, and preferably as high as 2,000 to 1 are employed in practice. The electrode is combined with this orificed structure to provide a limited surface of active electrode contact with the capacitor surface and at the same time the attachment of an electrical lead to the electrode is divorced from the problem of defining the active electrode. The other surface of the capacitor may be provided with a similar electrode structure.

Figure 7:
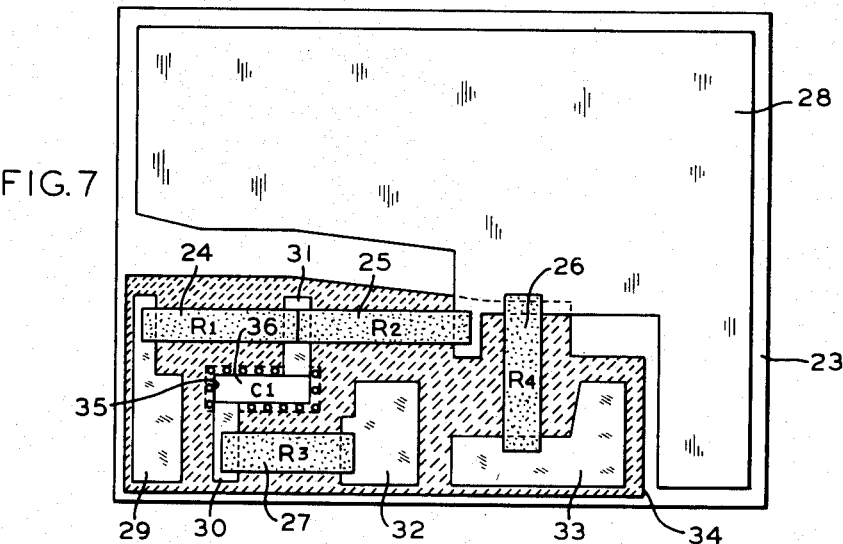
FIG. 7 is a plan view of a ceramic printed circuit embodying a capacitor of this invention.

A further embodiment of this invention is shown in FIG. 7 wherein a dielectric base layer 23 is shown having mounted thereon the components of an electrical circuit. These components are comprised of resistances 24, 25, 26 and 27 and capacitor electrode 28. Conducting paths 29, 30, 31, 32 and 33 are mounted on the base layer to connect together the components and to provide terminal areas of connection to the circuit. Additional large conductive electrodes, not shown, are mounted on the opposite side of the base layer 23.

Figure 8:
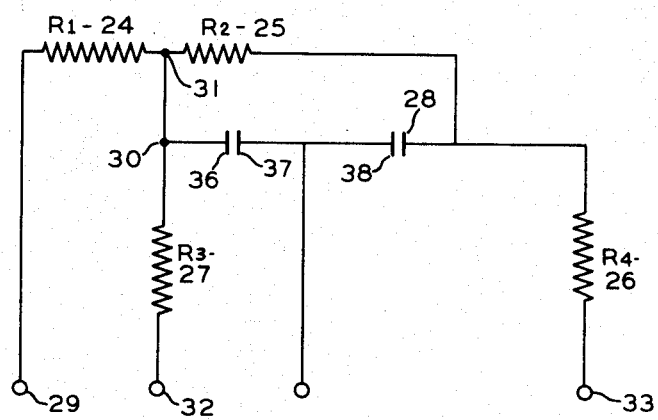
FIG. 8 is a schematic wiring diagram of the circuit of FIG. 7.

FIG. 8 shows a schematic wiring diagram for the printed circuit described above and illustrated in FIG. 7. This circuit is intended to show the electrical interconnection of the components of the circuit. The resistances 24, 25, 26 and 27 are shown in the circuit connected to electrodes 36 and 28 and conducting paths 29, 30, 31, 32 and 33. Terminal areas 29, 32 and 33 are provided for attaching lead wires for connection into an external circuit. FIG. 8 also shows opposite electrodes 37 and 38 which form with electrodes 36 and 28 respectively the capacitors of the circuit. The effective electrode area of the electrodes 37 and 38 is that portion of the conductive coating on the opposite side of the dielectric base layer 23 to the electrodes 36 and 28 respectively.

The printed circuit is prepared in an efficient and simple manner. A low-dielectric-constant coating 34 is placed on the surface of the layer 23 to underlie the terminals and resistors and separate them from the dielectric base 23. The low-dielectric-constant coating 34 is applied in two layers which are substantially coterminous. The outer layer is shown for the most part and the inner layer underlies and is substantially congruent with the outer layer. The outer layer is indicated by diagonal dashline shading. The outer layer and the inner layer are not screened on a centrally located area of the low-dielectric-constant coating 34. This absence of the layers provides an orifice 35 through the coating 34, to the surface of the dielectric base layer 23. The extent of the orifice formed by the hole in the outer layer is indicated by the absence of the dash-line shading and by the dotted line rectangle at the orifice 35. Within this rectangular orifice in the outer layer of the coating 34 there is also provided an aperture in the under layer of the coating 34. The underlayer itself is apertured to form the orifice 35 but provides a marginal lip around its opening which is indicated in FIG. 7 by the round O shading. The area of no coverage of the base layer 23 by the low-dielectric-constant coating is filled with an electrode 36 which is in contact with the surface of the layer 23. The area of active electrode provided by the electrode 36 is defined by the orifice 35. The capacitor electrode is connected by conducting paths 30 and 31 to resistances 24, 25 and 27 respectively. This is also shown in the schematic wiring diagram of FIG. 8.

As the active electrode area 36 is defined by the orifice in the low-dielectric-constant coating, the application of the conducting electrode material to the printed circuit surface provides electrode 36 and effects connection of the electrode into the circuit by means of simultaneously applied conducting paths 30 and 31. The material of electrode 36 may be comprised of the active electrode material which utilizes fully the high voltage sensitivity of the ceramic material, as described above, if the desired characteristics so require. While the construction of capacitor C1 which has been described in the two preceding paragraphs has been similar to the FIG. 6 construction, it should be understood that C1 may be obtained by following the teachings of FIGS. 1 to 4. That is, the active electrode of C1 may be applied to base 23 prior to the application of vitreous enamel layer 34. Should this last outlined procedure be followed, distinct electrode materials may be used for the active electrode and the conducting electrodes, as described in detail with respect to electrodes 12 and 15 of FIGS. 1 to 4.

This invention is advantageous in providing for the defining of the active electrode area and separating that active electrode area definition from the problem of making electrical contact with the electrode. As pointed out above, where small electrode area is desired but other considerations require larger electrode surfaces, it is desirable to be able to provide a small electrode surface in combination with a large area available for attaching relatively large leads to the electrode. It is also desirable to be able to automatically limit active electrode area so that component and circuit construction and assembly can be made as simple and automatic as possible. This is particularly advantageous for use in small capacitors operable at radio frequencies. As pointed out above the large area of the non-critical electrode aids in heat dissipation which can be combined with the heat dissipation properties of the coating resin and the button type mounting to provide a good heat dissipation of the finished capacitor.

Some of the modifications have been set forth above. Various further modifications are possible. For example, the vitreous enamel is a low-dielectric-constant material as distinguished from the high-dielectric-constant ceramic capacitor dielectric. Other materials having similar properties which can be applied to form the structure of this invention may be employed.

As many apparently widely different embodiments of this invention may be made without departing from the spirit and scope thereof, it is to be understood that we do not limit ourselves to the specific embodiments herein.

What is claimed is:

1. A ceramic capacitor comprising a thin high-dielectric-constant ceramic disc having opposed flat surfaces, a first electrode covering a minor area of one of said surfaces, a second electrode covering a major area of the other of said surfaces and being in capacitive relation to the entire area of said first electrode, an insulating annulus positioned on said one surface so that the exposure through the annulus opening is limited to said first electrode, and a conductive layer overlying said annulus and said exposed first electrode.

2. The ceramic capacitor defined in claim 1 wherein a first conductive lead is attached to said conductive layer, and a second conductive lead is attached to said second electrode.

3. A ceramic capacitor comprising a thin high-dielectric-constant ceramic member having a flat surface, an electrode covering a minor area of said surface, an insulating annulus positioned on said surface so that the exposure through the annulus opening is limited to said electrode, and a conductive layer overlying said annulus and said electrode.

4. A ceramic capacitor as defined in claim 3 wherein a second surface of said thin member opposed to said flat surface is provided with a second electrode opposite said electrode, a second insulating annulus being positioned on said second surface so that the exposure through said second annulus opening is limited to said second electrode, and a second conductive layer overlying said second annulus and said second electrode.

5. In a capacitor as claimed in claim 3, said electrode composed of a formulation utilizing the high voltage sensitivity of the thin dielectric material.

6. In a capacitor as claimed in claim 3, said electrode composed of a formulation utilizing the high voltage sensitivity of the thin dielectric material and said conductive layer being a material having high solderability.

References Cited in the file of this patent

UNITED STATES PATENTS

| | | |
|---|---|---|
| 1,906,691 | Lilienfeld | May 2, 1933 |
| 2,444,255 | Hewlett | June 29, 1948 |
| 2,509,758 | Brockman | May 30, 1950 |
| 2,673,949 | Khouri | Mar. 30, 1954 |
| 2,721,822 | Pritikin | Oct. 25, 1955 |
| 2,758,267 | Short | Aug. 7, 1956 |
| 2,794,940 | Roup | June 4, 1957 |
| 2,871,428 | Shen | Jan. 27, 1959 |

FOREIGN PATENTS

| | | |
|---|---|---|
| 123,619 | Australia | Mar. 6, 1947 |
| 619,193 | Great Britain | Mar. 4, 1949 |